(12) United States Patent
Hosokawa

(10) Patent No.: US 8,739,107 B2
(45) Date of Patent: May 27, 2014

(54) SIGNAL SELECTION APPARATUS AND SYSTEM, AND CIRCUIT EMULATOR AND METHOD AND PROGRAM

(75) Inventor: Kohei Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1367 days.

(21) Appl. No.: 12/521,606

(22) PCT Filed: Nov. 30, 2007

(86) PCT No.: PCT/JP2007/073173
§ 371 (c)(1),
(2), (4) Date: Jun. 29, 2009

(87) PCT Pub. No.: WO2008/081669
PCT Pub. Date: Jul. 10, 2008

(65) Prior Publication Data
US 2009/0319219 A1    Dec. 24, 2009

(30) Foreign Application Priority Data

Dec. 28, 2006  (JP) ................................. 2006-354949

(51) Int. Cl.
*G06F 17/50*  (2006.01)
(52) U.S. Cl.
USPC .......................................... 716/136; 716/133
(58) Field of Classification Search
USPC ............ 716/132, 133, 134, 135, 136; 714/30, 714/37, 39, 724, 726; 702/117
See application file for complete search history.

(56) References Cited

U.S. PATENT DOCUMENTS

| 6,151,568 | A | 11/2000 | Allen et al. |
| 6,810,482 | B1 | 10/2004 | Saxena et al. |
| 2006/0041803 | A1* | 2/2006 | Woodward et al. ........... 714/724 |

FOREIGN PATENT DOCUMENTS

| JP | 1889026243 A | 1/1889 |
| JP | 2002288257 A | 10/2002 |
| JP | 2004062238 A | 2/2004 |

OTHER PUBLICATIONS

Supplementary European Search Report for EP 07 83 2855 completed Mar. 12, 2012.
C. J. N. Coelho et al., "Hardware-Software Codesign of Embedded Systems", Integrated Circuit Design, IEEE, 1998, pp. 2-8.
International Search Report for PCT/JP2007/073173 mailed Jan. 22, 2008.
D. Drako, et al., "HDL Verification Coverage", Integrated System Design Magazine, p. 46-52, Jun. 1998.

* cited by examiner

*Primary Examiner* — Vuthe Siek
(74) *Attorney, Agent, or Firm* — Sughrue Mion, PLLC

(57) ABSTRACT

Disclosed is a system in which in order to obtain the operation parameter of a circuit based on an implementable area indicating a circuit scale that can be implemented on a circuit implementation device, circuit area information, and operation parameter measuring circuit area information, an observation signal number determining means determines observation signal information on a circuit that obtains the operation parameter of the circuit. The number of the extracted signals is determined in view of the area that can be implemented on a digital LSI or an emulator and the area of the circuit to be implemented (refer to FIG. 1).

10 Claims, 19 Drawing Sheets

FIG. 19

```
module top(clk, count, hit);
   input clk;
   output [9999:0] count;
   output hit;
   wire enable;
   reg [9999:0] count;

assign enable = 1'b1;
   assign hit = count == 10000'h12345678;

always @(posedge clk)
      if (enable)
         count <= count + 10000'h1;

endmodule
```

SIGNAL SELECTION APPARATUS AND SYSTEM, AND CIRCUIT EMULATOR AND METHOD AND PROGRAM

The present invention is the National Phase of PCT/JP2007/073173, filed Nov. 30, 2007, which claims the priority of Japanese Patent Application No. 2006-354949 (filed on Dec. 28, 2006), the entirety of which is incorporated by reference herein.

TECHNICAL FIELD

The present invention relates to a method, an apparatus, and a computer program for reducing an error when an operation parameter of a logic circuit, in particular, a toggle rate or power consumption is estimated.

BACKGROUND ART

In recent years, semiconductor devices such as a digital LSI (Large Scale Integrated circuit) have achieved a remarkably high integration, a remarkably high function, and a remarkable increase in size. Thus, it is important to verify functions of the LSI in a design stage. The verification of the LSI before manufacture is especially important in order to avoid re-manufacturing or the like as well.

When verifying the LSI, it is a common practice to enumerate the functions of the LSI and verify each of the functions.

In a conventional LSI design approach, the functions of the LSI are manually enumerated. For this reason, omission of the enumeration may occur.

Further, in the conventional LSI design approach, in addition to verification by enumerating all the functions, appropriateness of verification is measured by using other indicators. One of the indicators is a toggle rate (described in Non-patent Document 1). The toggle rate indicates a signal change rate when an operation of a circuit has been finished, and is obtained by an expression of (L+H)/2N. L indicates the number of signals which have been changed from a logical 1 to a logical 0, H indicates the number of signals which have been changed from the logical 0 to the logical 1, and N indicates the number of all the signals that are present in the circuit. For obtaining the toggle rate, information (changes) on all the signals in the LSI is necessary.

Patent Document 1:
JP Patent Kokai Publication No. JP-A-01-026243
Non-patent Document 1:
D. Drako and P. Cohen, "HDL Verification Coverage," Integrated System Design Magazine, pp. 46-52, June 1998.

SUMMARY

The disclosures of the Patent Document 1 and Non-patent Document 1 described above are incorporated herein by reference. An analysis of the related art by the present invention will be given below.

However, it has become difficult to observe all the signals in a large-scale digital LSI (refer to Patent Document 1). That is, observing all the signals in the circuit and obtaining the toggle rate cannot be performed by the digital LSI or an emulator.

Accordingly, an object of the present invention is to provide a method, an apparatus, and a program that reduce an estimation error and improve confidence coefficient in finding an operation parameter of a circuit.

In order to solve one or more of the problems described above, the invention disclosed in this application is generally configured as follows.

In accordance with one aspect (aspect) of the present invention, there is provided an apparatus (observation signal information determination apparatus) that determines information on signal(s) to be observed for obtaining an operation parameter of a circuit. The signal(s) to be observed for obtaining an operation parameter of a circuit is or are referred to as observation signal(s). The apparatus includes: an observation signal information determining means that determines the observation signal information on the Circuit from information on the circuit scale that may be implemented on a circuit implementation device and information on the circuit, so as to obtain the operation parameter.

In the apparatus of the present invention, the observation signal information determining means obtains a surplus circuit scale when the circuit implementation device implements the circuit, and determines the maximum number of the observation signals from the surplus circuit scale and a circuit scale necessary when one observation signal is added.

In the apparatus of the present invention, the surplus circuit scale when the circuit implementation device implements the circuit corresponds to a remainder obtained by subtracting the area of the circuit from the information on the circuit scale that may be implemented on the circuit implementation device, and the number of the observation signals is determined based on a value obtained by dividing the surplus circuit scale by the circuit scale necessary when the one observation signal is added.

In the apparatus of the present invention, there may further be provided:
a calculation means that statistically determines an estimation error range and/or confidence coefficient from the number of the observation signals and the number of signals of the circuit.

According to another aspect of the present invention, there is provided an apparatus (signal selection apparatus) that determines information on observation signals for obtaining an operation parameter of a circuit. The apparatus includes:
an observation signal selecting means that selects an observation signal so that the circuit and a circuit that observes the selected observation signal may be implemented on a circuit implementation device, based on information on a circuit scale that may be implemented on the circuit implementation device, information on the circuit, and signal candidates for signals of the circuit to be observed.

The apparatus of the present invention may further include:
a calculation means that statistically determines an estimation error range and/or confidence coefficient from the number of the observation signals and the number of the signals of the circuit.

In the apparatus of the present invention, the circuit implementation device may be implemented by a plurality of circuit implementation devices. The observation signal information determining means may obtain each surplus circuit scale when each of the plurality of circuit implementation devices implements a predetermined portion of the circuit. Then, the observation signal information determining means may determine the maximum number of the observation signals that may be implemented by each of the circuit implementation devices from the respective surplus circuit scale and the circuit scale necessary when the one observation signal is added.

The apparatus of the present invention may further include:
a calculation means that statistically determines an estimation error range and/or confidence coefficient from the sum of the numbers of the observation signals determined by the observation signal information determining means and the number of signals of the circuit.

An apparatus (circuit implementation device selection supporting apparatus) according to further another aspect (aspect) of the present invention presents information on the estimation error range and/or confidence coefficient of the operation parameter with respect to each of the plurality of circuit implementation devices to a user, using the calculation means, thereby supporting circuit implementation device selection.

In the apparatus of the present invention, the operation parameter is a toggle rate or power consumption, and the calculation means statistically determines the estimation error range and the confidence coefficient, assuming that the probability distribution of the operation parameter is a normal distribution.

An apparatus of the present invention may include:

an observation signal selecting means that selects the observation signals of the determined number from signals of the circuit.

In the apparatus of the present invention, the observation signal selecting means selects a signal other than a signal known in advance not to change, as the observation signal.

In the apparatus of the present invention, the observation signal selecting means further selects a signal other than a signal known in advance to change, as the observation signal.

The apparatus of the present invention further includes:

a circuit analysis means that analyzes a dependent relationship each signal, the observation signal selecting means selecting the observation signals so that there is no dependence among the selected signals based on the dependent relationship analyzed by the circuit analysis means.

A circuit modification system according to still another aspect (aspect) of the present invention, includes, for the observation signal selected by the apparatus of the present invention:

a circuit insertion means that inserts into the circuit a change detection circuit that detects a change in the observation signal, and a read circuit that reads the detected change in the observation signal.

In the circuit modification system of the present invention, the change detection circuit further detects the number of changes in the observation signal, and the read circuit reads the number of changes in the observation signal.

In the circuit modification system of the present invention, the change detection circuit may include means for determining whether or not to detect the change in the observation signal.

A circuit emulator according to still another aspect (aspect) of the present invention emulates the circuit modified by the circuit modification system, and the circuit emulator includes an estimation means that estimates the toggle rate of the overall circuit from the number of the observation signals that have changed, read by the read circuit.

A circuit emulator of the present invention may emulate the circuit modified by the circuit modification system, and the circuit emulator may include an estimation means that estimates power consumption of the overall circuit from the number of changes in the observation signal, read by the read circuit.

A circuit device according to the present invention is a semiconductor circuit device including:

a circuit under measurement; and a measuring circuit for measuring an operation parameter of the circuit under measurement based on observation signals of the circuit under measurement; wherein the number of the observation signals of the circuit under measurement is determined, based on a value obtained by dividing a surplus area in the semiconductor circuit device with the circuit under measurement implemented thereon by the area of the measuring circuit necessary for each observation signal, and the measuring circuit includes:

detection circuits disposed corresponding to the number of the observation signals and respectively connected to the corresponding observation signals; and a read circuit that reads a result of detection at each of the detection circuits.

According to the present invention, the device according to each aspect described above, the method corresponding to the invention of the system, and the invention of a computer program are provided.

The present invention obtains the number of the signals to be observed from the area that can be implemented on a digital LSI or an emulator, the area of the circuit targeted for measurement, and the area of the change detection circuit that detects presence or absence of a change in each of the signals. Thus, the circuit targeted for measurement can be implemented on the digital LSI or emulator without fail. The range of the estimation error of the measured toggle rate can be minimized. Alternatively, the confidence coefficient can be maximized.

In the present invention, when a plurality of digital LSIs or a plurality of emulators having different implementable circuit scales are present, it can be known in advance how much range of the estimation error or how much confidence coefficient of the toggle rate can be measured by each digital LSI or each emulator.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 19 is a description example of a circuit for explaining a specific example of the present invention.

PREFERRED MODES

In order to describe the above-mentioned present invention in further detail, a description will be given below with reference to appended drawings. The present invention is a signal selection apparatus for obtaining the toggle rate or power consumption of a circuit by a digital LSI or an emulator. The present invention includes a signal enumeration means for enumerating signals of the circuit targeted for measurement of the toggle rate or power consumption and observation signal number determining means for maximizing the number of the signals to be observed in a range that can be implemented on a digital LSI or emulator, based on the circuit scale that can be implemented on the digital LSI or emulator, the area of the circuit analyzed by circuit area analyzing means, and the area of a change detection circuit that detects whether one of the signals is changed or not. A description will be given below in connection with some exemplary embodiments.

First Exemplary Embodiment

Figure 1:
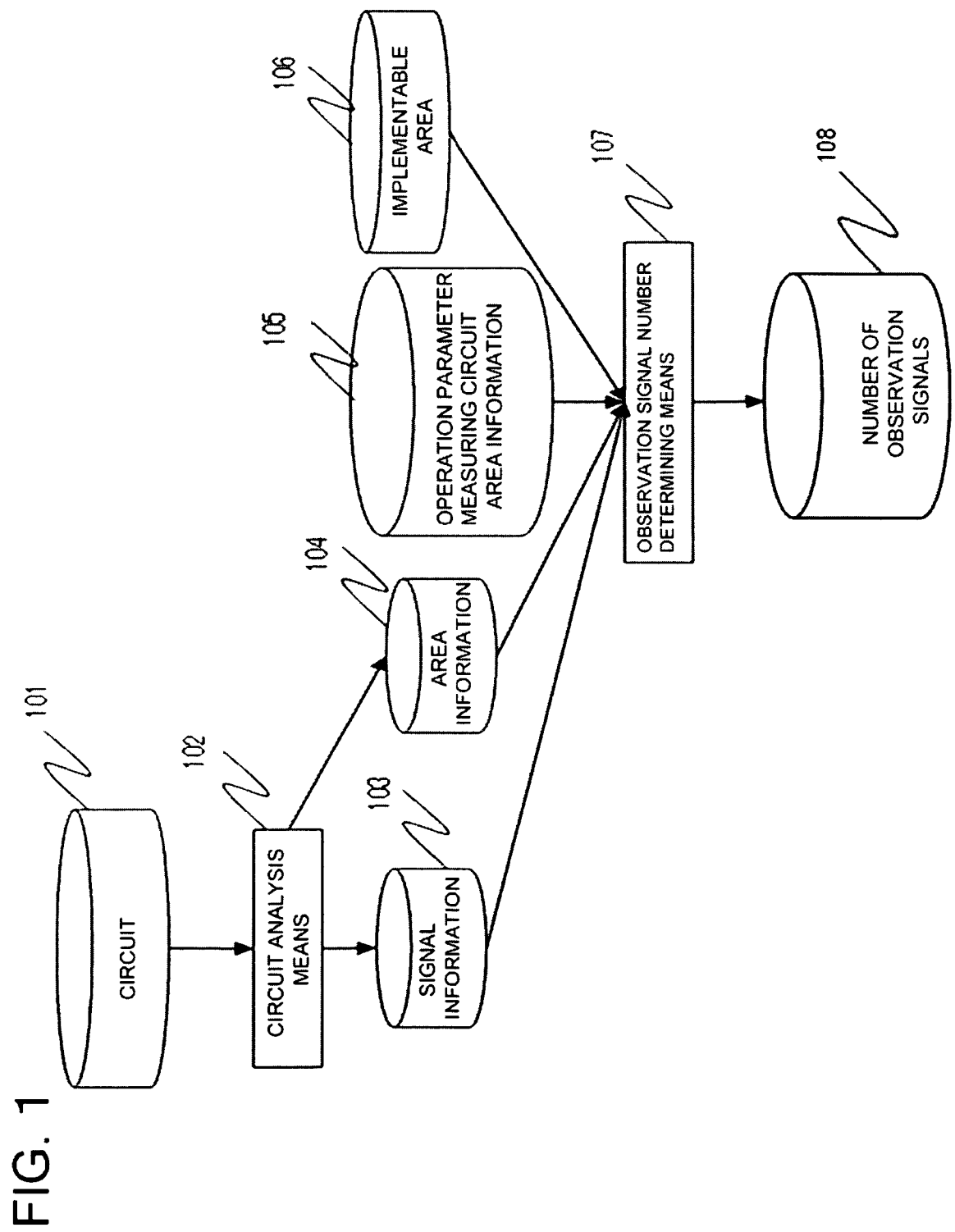
FIG. 1 is a diagram showing a configuration of a first exemplary embodiment of the present invention.

FIG. 1 is a diagram for explaining a configuration of a system according to a first exemplary embodiment of the present invention. Referring to FIG. 1, the system according to the first exemplary embodiment includes a circuit analysis means (unit) 102 and observation signal number determining means (unit) 107. The circuit analysis means 102 receives a circuit 101 that is described in Verilog-HDL (hardware description language) or VHDL and targeted for operation parameter measurement, analyzes the circuit 101, and outputs signals (signal information) 103 that are present in the circuit 101 targeted for operation parameter measurement and area information 104 on the circuit 101. The observation signal number determining means 107 determines the maximum number of observation signals that may be implemented by a circuit implementation device, from the area information 104 on the circuit 101, operation parameter measuring circuit area information 105 and an implementable area 106 that can be implemented on the circuit implementation device that implements an operation of the circuit 101. The signal information 103, the area information 104 on the circuit 101, the operation parameter measuring circuit area information 105 and the implementable area 106 are stored in respective storage regions or storage units, from which the observation signal number determining means 107 reads the respective information.

The operation parameter circuit area information 105 is circuit area information on an observation signal detection circuit and the like, necessary for observing the signals of the circuit 101 targeted for operation parameter measurement. In the present exemplary embodiment, the operation parameter measuring circuit area information 105 is provided in advance.

The implementable area 106 is the area of a semiconductor device where the circuit 101 targeted for operation parameter measurement and the operation parameter measuring circuit are implemented. In the present exemplary embodiment, the implementable area 106 is provided in advance.

The circuit 101 is the circuit (source text that describes the circuit) described in a hardware description language such as Verilog-HDL or VHDL. A method of describing the circuit 101 is not limited to use of the language of Verilog-HDL or VHDL. The circuit 101 may be described by a circuit diagram. Alternatively, the circuit 101 may be described in another hardware description language.

The circuit analysis means 102 enumerates all the signals (signals defined by a circuit description or the like, for example) that are present in the circuit 101, and stores information on the signals in the signal information 103. The circuit analysis means 102 enumerates all the information with no dependence on signal characteristics.

The circuit analysis means 102 analyzes the area of the circuit 101 in the circuit implementation device, and generates the circuit information 104. The circuit implementation device may be an actual chip, a hardware emulator formed of an FPGA (field programmable gate array) and so forth.

The observation signal number determining means 107 determines a maximum number of observation signals 108 that can be implemented by the circuit implementation device, from the area in formation 104, operation parameter measuring circuit area (area information on the operation parameter measuring circuit) 105, and the area (implementable area) 106 that can be implemented on the circuit implementation device.

An example of a method in which the observation signal number determining means 107 determines the maximum number of observation signals that can be implemented by the circuit implementation device, using three area information, will be described. Assume that the circuit implementation device is implemented by the FPGA, the area that can be implemented on the FPGA is 10000, and the circuit area of the circuit 101 implemented on the FPGA is 6000 (which means that a surplus circuit area is 10000−6000=4000). When the operation parameter measuring circuit area information 105 is 10 per signal, the observation signal number determining means 107 calculates (10000−6000)÷10, thereby obtaining the number of observation signals 108 of 400. The area per observation signal may be stored as the operation parameter measuring circuit area information 105. Alternatively, as the operation parameter measuring circuit area information 105, information on the area and the number of signals for measuring the observation signals may be provided. When the area information on the circuit 101 is indicated by A, the area of the operation parameter measuring circuit is indicated by B per signal, and the implementable area of the circuit implementation device is indicated by S, the number of observation signals is obtained by an expression of (S−A)/B.

Next, an overall operation of the present exemplary embodiment will be described with reference to FIG. 2.

In step S201, the circuit analysis means 102 analyzes signals targeted for operation parameter measurement in the inputted circuit 101, and generates the signal information 103 on the signals.

The circuit analysis means 102 analyzes the area to be used by the circuit 101 and stores information on the area in the area information 104.

In step S202, the maximum number of observation signals 108 that can be implemented by the circuit implementation device is determined from the area information 104 generated in step S201, operation parameter measuring circuit area information 105, and implementable area 106 that can be implemented on the circuit implementation device.

In the present exemplary embodiment, the circuit to be measured can be implemented on a digital LSI or an emulator without fail. Further, the range of an operation parameter estimation error can be minimized or confidence coefficient can be maximized. This is because the area implementable into the digital LSI or emulator is used as a parameter when determining the number of observation signals 108. Processes and functions of the circuit analysis means 102 and the observation signal number determining means 107 in the present exemplary embodiment may be implemented by a program that is executed on a computer.

Second Exemplary Embodiment

Figure 3:
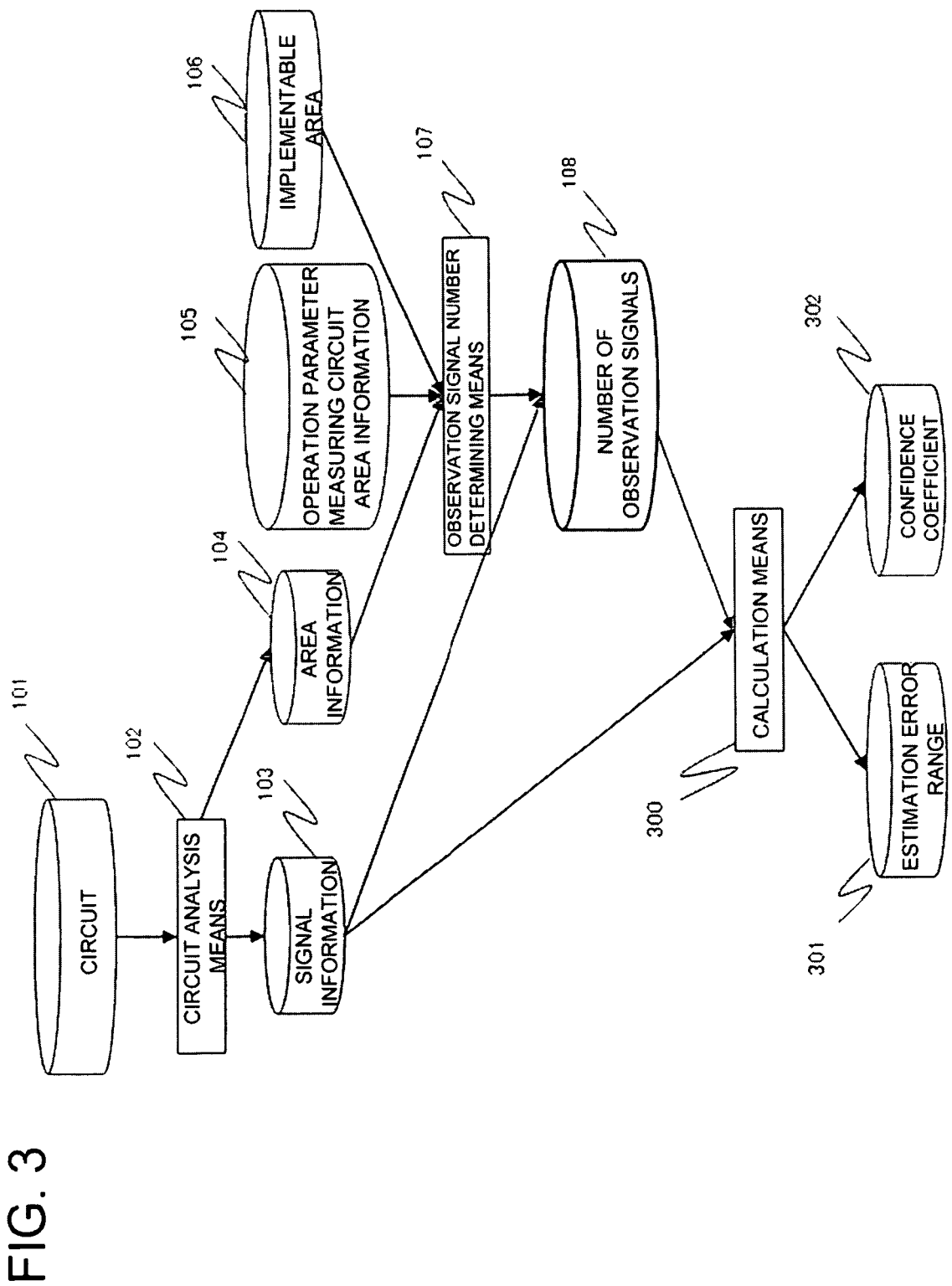
FIG. 3 is a diagram showing a configuration of a second exemplary embodiment of the present invention.

Next, a second exemplary embodiment of the present invention will be described with reference to FIG. 3. A calculation means 300 that statistically determines an estimation error range 301 or confidence coefficient 302 from the number of signals that is present in the circuit 101 and from the number of observation signals 108 is added to the configuration of the first exemplary embodiment.

Assume that the number of signals that are present in the circuit 101 is indicated by N, the number of observation signals 108 is indicated by m, the estimation error range 301 is indicated by e, and the confidence coefficient 302 is indicated by q. Then, the calculation means 300 can statistically determine the estimation error range e using Expression (1) and can statistically determine the confidence coefficient q using Expression (2).

$$e = Q^{-1}\left(\frac{1-q}{2}\right)\sqrt{\frac{N-m}{m(N-1)}} \quad (1)$$

$$q = 1 - 2Q\left(e\sqrt{\frac{m(N-1)}{N-m}}\right) \quad (2)$$

Here, a function Q(•) is an upper probability function of a standard normal distribution, while a function Q−1(•) is the inverse function of the upper probability function. Above Expressions (1) and (2) are the expressions where an operation parameter probability distribution is assumed to be the normal distribution.

If N is set to 10000, m is set to 1000, and q is set to 0.95, the estimation error range substantially becomes 0.0588, based on the expression (1). If N is set to 10000, m is set to 1000, and e is set to 0.05, the confidence coefficient q substantially becomes 0.90508, based on the expression (2).

Figure 4:
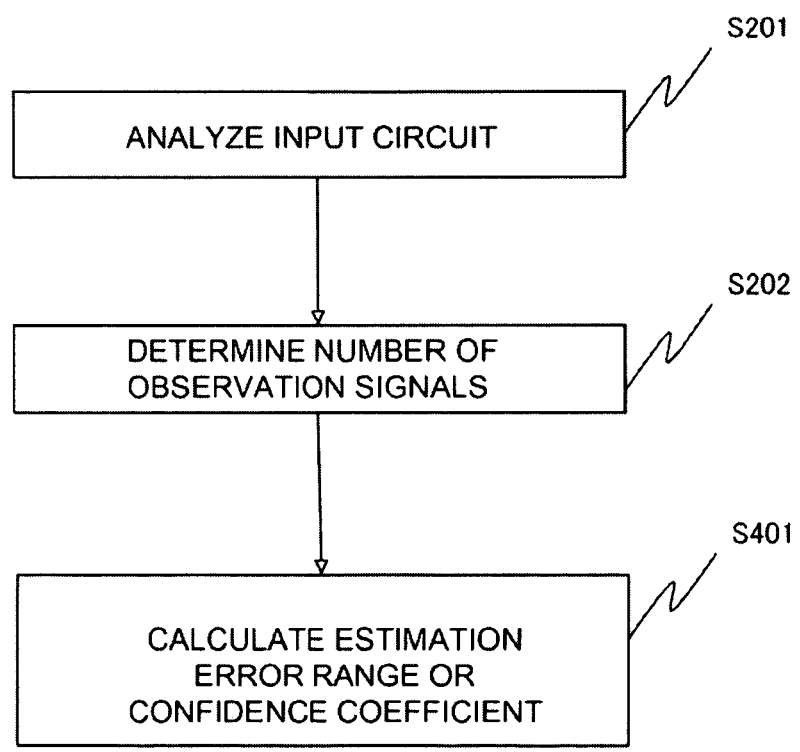
FIG. 4 is a flowchart for explaining an operation of the second exemplary embodiment of the present invention.

Next, an overall operation of the second exemplary embodiment will be described with reference to FIG. 4. Referring to FIG. 4, the overall operation of the present exemplary embodiment is obtained by adding step S401 to the operation of the first exemplary embodiment in FIG. 2. It step S401, the calculation means 300 statistically determines the estimation error range 301 or the confidence coefficient 302 from the number of the signals that are present in the circuit 101 and the number of observation signals 108. Since the contents of calculation are described in the operation of the calculation means 300, description of the contents of calculation will be omitted.

Next, an operation and an effect of the present exemplary embodiment will be described. In the present exemplary embodiment, the circuit to be measured can be implemented on a digital LSI or an emulator, without fail. Further, the estimation error of a measured operation parameter can be minimized, or confidence coefficient can be maximized. Further, it can be known to which extent the value of a measured operation parameter is statistically guaranteed. In the present exemplary embodiment, processes and functions of the circuit analysis means 102, observation signal number determining means 107, and calculation means 300 may be implemented by a program that runs on a computer.

Third Exemplary Embodiment

Figure 5:
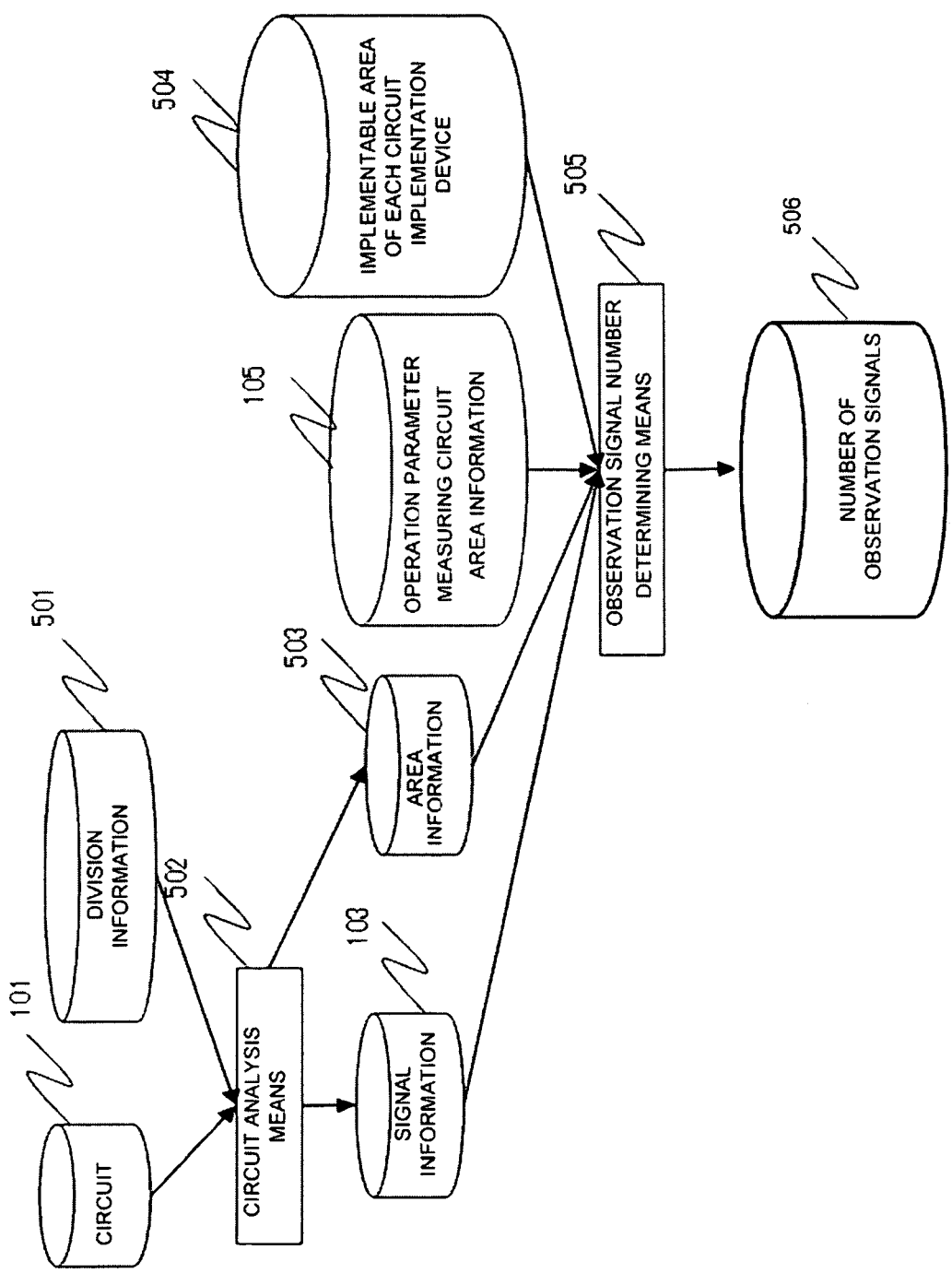
FIG. 5 is a diagram showing a configuration of a third exemplary embodiment of the present invention.

Next, a third exemplary embodiment of the present invention will be described with reference to FIG. 5. In the third exemplary embodiment of the present invention, the circuit implementation device that implements an operation of the circuit 101 is formed of a plurality of circuit implementation devices. In the third exemplary embodiment, it is known in advance by which of the circuit implementation devices each block in the circuit 101 is implemented, and the content of the information indicating the allocation is supplied as division information 501. When the circuit implementation device is a hardware emulator formed of a plurality of FPGAs, for example, which block in the circuit 101 is implemented by which FPGA is stored in the division information 501.

It the third exemplary embodiment of the present invention, the division information 501 is added to the first exemplary embodiment, and the third exemplary embodiment includes different circuit analysis means 502, different area information 503, a different implementable area 504 of each circuit implementation device, different observation signal number determining means 505, and a different number of observation signals 506. The other means are the same as those in the first exemplary embodiment. Details of these means will be described.

The division information 501 stores the information indicating on which circuit implementation device each block of the circuit 101 is implemented. These information is provided in advance.

The circuit analysis means 502 analyzes the sum of the areas of blocks of the circuit 101 implemented on the respective circuit implementation devices, based on the division information 501, and stores the sum of the areas in the area information 503 for each circuit implementation device.

For each circuit implementation device, the observation signal number determining means 505 determines the maximum number of observation signals 506 that can be implemented by the circuit implementation device, from the area information 503, operation parameter measuring circuit area information 105, and the implementable area 504 that can be implemented on the circuit implementation device. The method of calculating the maximum number of observation signals is the same as in the first exemplary embodiment. Assume that the circuit implementation device is implemented by two FPGAs (hereinafter referred to as FPGA1 and FPGA2), the area that can be implemented on the FPGA1 is 10000, and the area that can be implemented on the FPGA2 is 20000, for example. When the sum of the circuit areas of the circuit 101 implemented by the FPGA1 is 6000, the sum of the circuit areas of the circuit 101 implemented by the FPGA2 is 8000, and the operation parameter measuring circuit area is 10 per signal, the observation signal number determining means 505 calculates (10000−6000)÷10 for the FPGA1, and calculates (20000−8000)÷10 for the FPGA2. Then, the observation signal number determining means 505 determines the number of observation signals for the FPGA1 as 400 and determines the number of observation signals for the FPGA2 as 1200.

Figure 6:
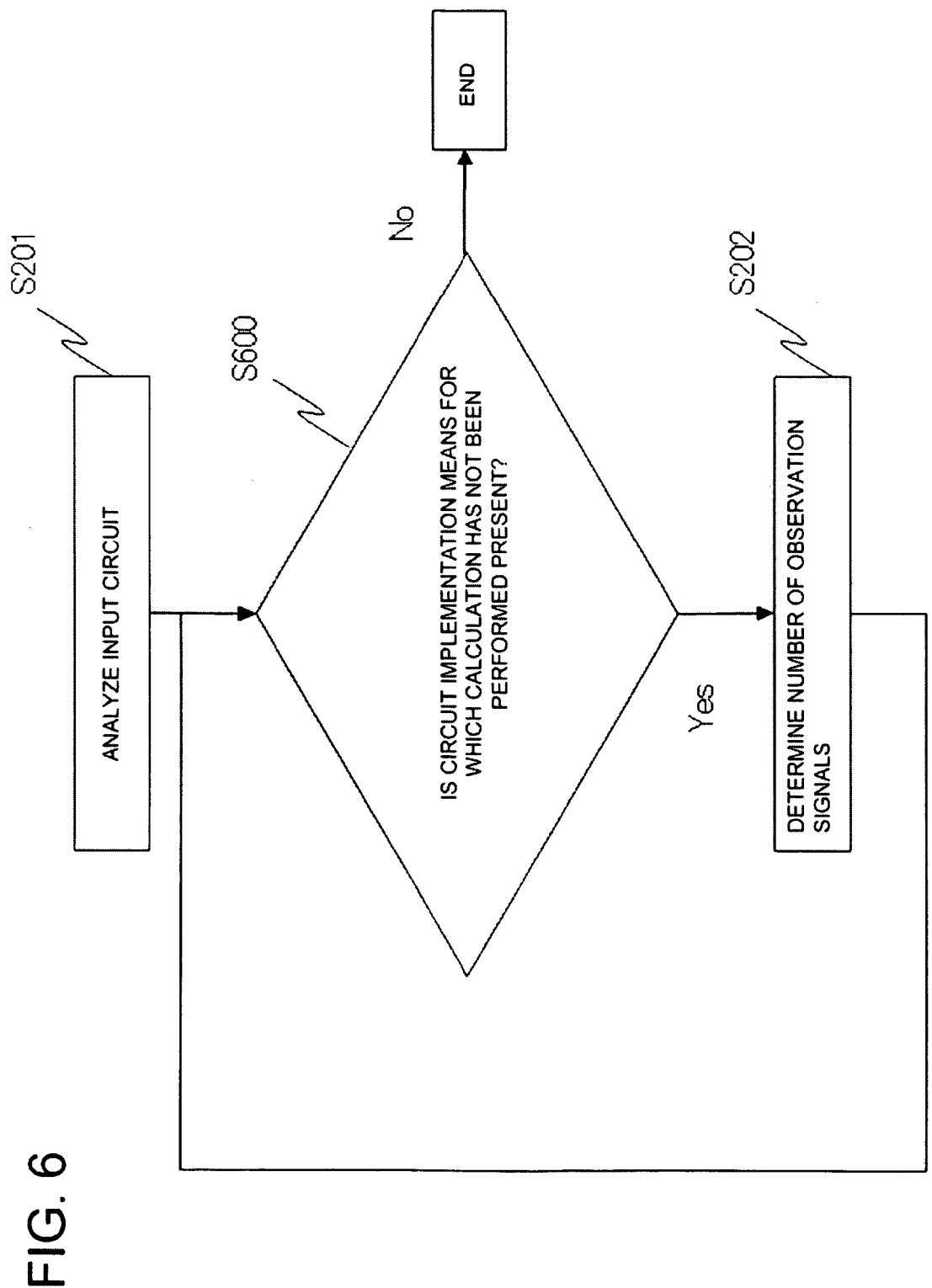
FIG. 6 is a flowchart for explaining an operation of the third exemplary embodiment of the present invention.

Next, an overall operation of the present exemplary embodiment will be described with reference to a flowchart in FIG. 6.

The overall operation of the present exemplary embodiment is obtained by adding step S600 to the first exemplary embodiment.

Step S600 is a branch step for determining for each implementation device the maximum number of observation signals 506 that can be implemented by the circuit implementation device, from the area information 503, operation parameter measuring circuit area information 105, and implementable area 504 that can be implemented on the circuit implementation device by step 202.

Next, an operation and an effect of the present exemplary embodiment will be described. This exemplary embodiment has an effect that the circuit targeted for measurement can be all implemented on digital LSIs or emulators without fail even if the circuit implementation device is formed of the plurality of the circuit implementation devices, and the range of the estimation error of a measured operation parameter can be minimized or confidence coefficient can be maximized. In the present exemplary embodiment, processes and functions of the circuit analysis means 502 and the observation signal number determining means 505 may be implemented by a program that runs on a computer.

Fourth Exemplary Embodiment

Next, a fourth exemplary embodiment of the present invention will be described. Being different from the second exemplary embodiment, the fourth exemplary embodiment of the present invention simultaneously determines estimation error ranges or confidence coefficients with respect to a plurality of digital LSIs or emulators having different implementable areas. Being different from the circuit implementation devices in the third exemplary embodiment, each of a plurality of circuit implementation devices is constituted from one circuit implementation device, but has a different implementable circuit area.

Figure 7:
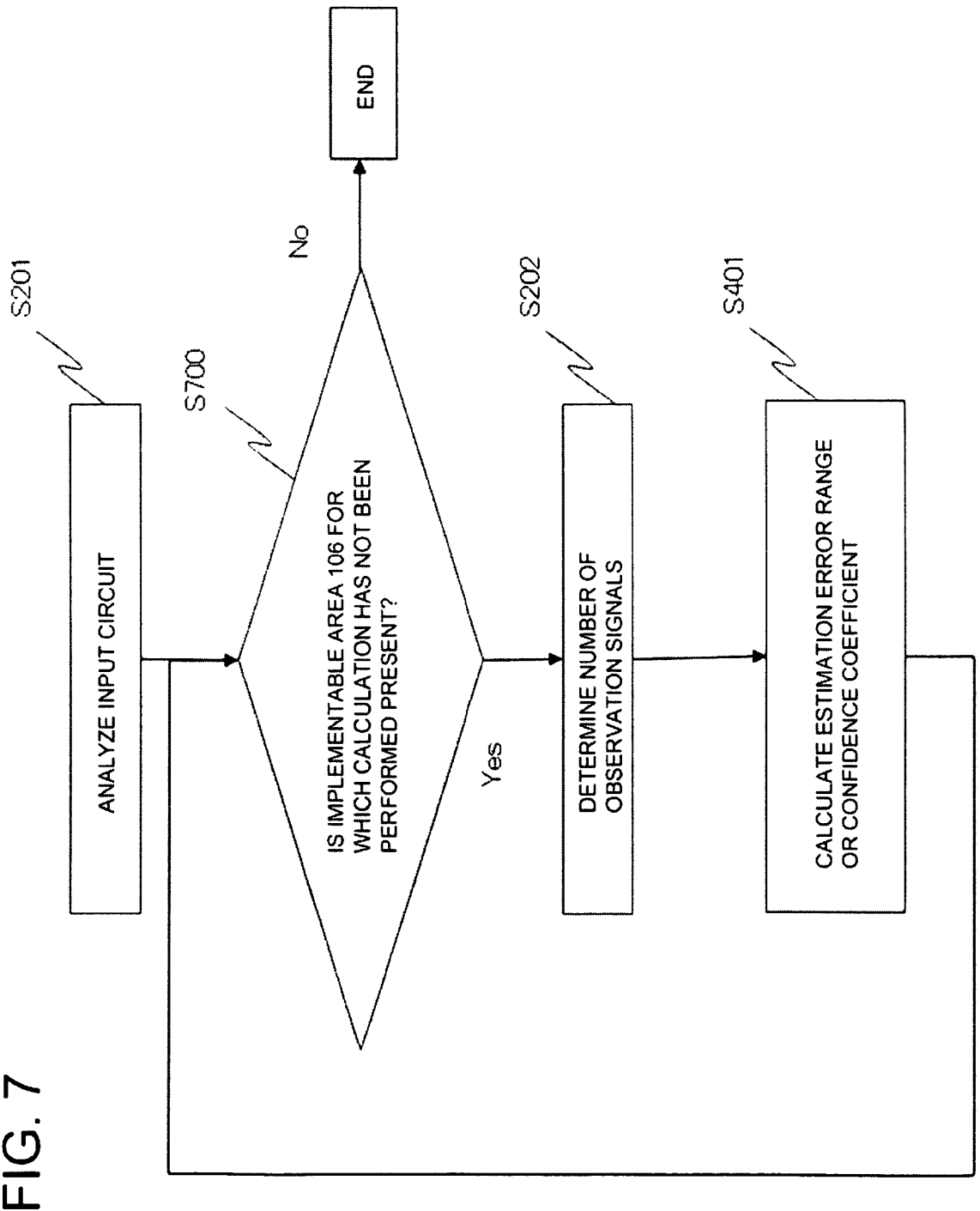
FIG. 7 is a flowchart for explaining an operation of a fourth exemplary embodiment of the present invention.

This exemplary embodiment has the same configuration as the second exemplary embodiment. However, the implementable area 106 of the digital LSI or emulator is not one and is formed of a plurality of implementable areas. An overall operation of the fourth exemplary embodiment will be described with reference to a flowchart in FIG. 7.

In the fourth exemplary embodiment, in order to determine the estimation error range 301 or confidence coefficient 302 for each implementable area 106, step S700 is added to the second exemplary embodiment.

Step S700 is a branch step for executing steps S202 and S401 for each of all the implementable areas 106, thereby determining the estimation error range 301 or confidence coefficient 302. That is, step S700 is the step which terminates the operation when the estimation error ranges 301 or confidence coefficients 302 for all the circuit implementation devices are determined.

Next, an operation and an effect of this embodiment will be described. Since the present exemplary embodiment simultaneously determines the estimation error ranges or confidence coefficients for the plurality of digital LSIs or emulators having the different implementable areas, a user can know which digital LSI or emulator having which level of the implementable areas should be used in order to obtain an expected estimation error range or expected confidence coefficient. Further, the obtained estimation error range or confidence coefficient can be implemented without fail.

Fifth Exemplary Embodiment

Figure 8:
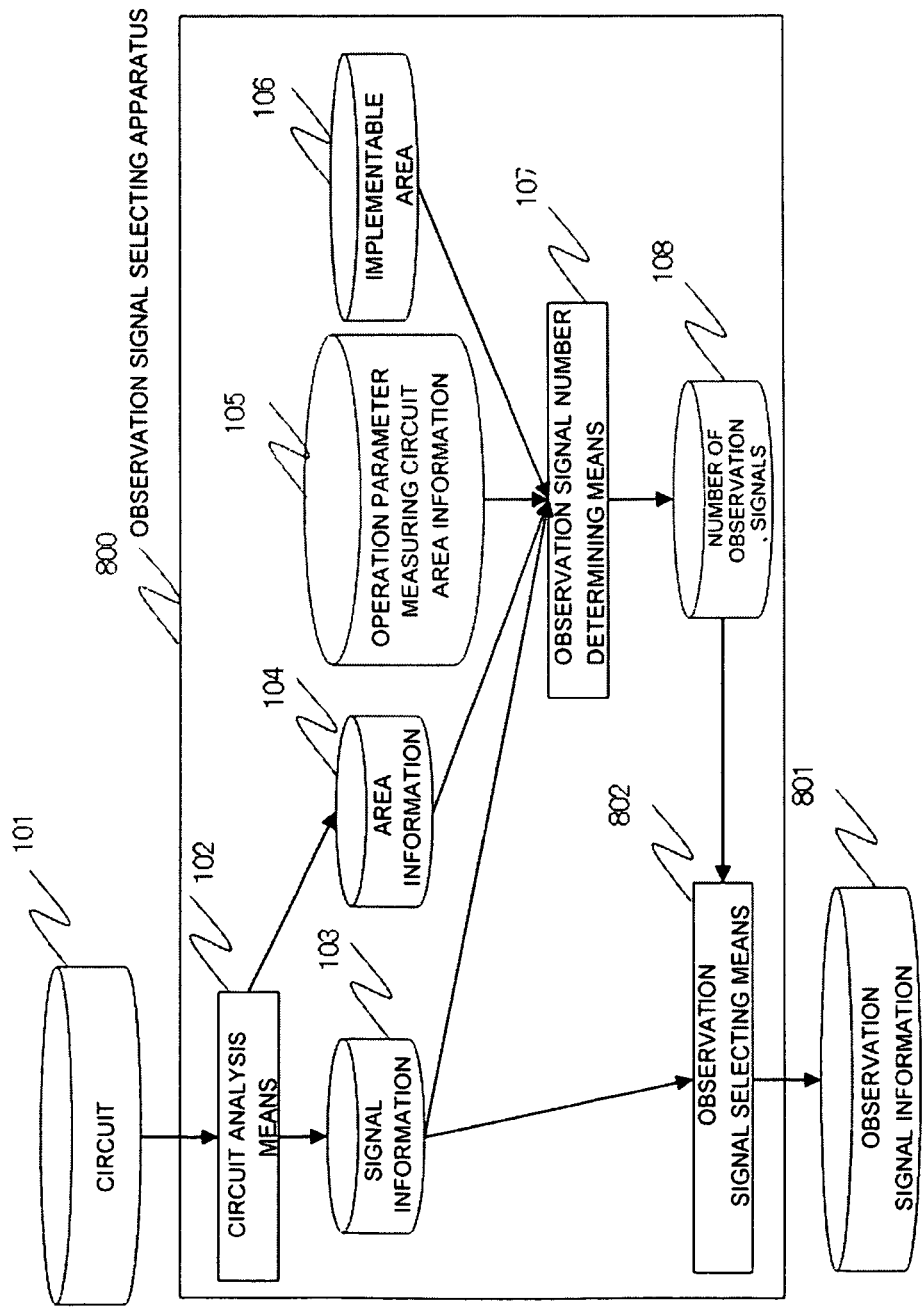
FIG. 8 is a diagram showing a configuration of a fifth exemplary embodiment of the present invention.
Figure 9:
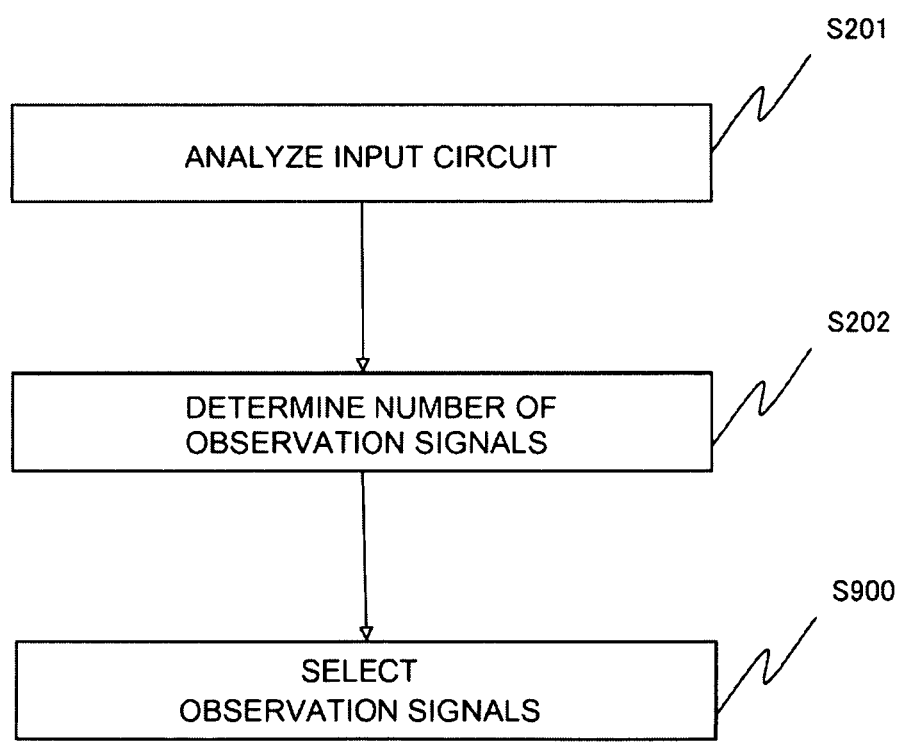
FIG. 9 is a flowchart for explaining an operation of the fifth exemplary embodiment of the present invention.

Next, a fifth exemplary embodiment of the present invention will be described with reference to FIGS. 8 and 9. In the fifth exemplary embodiment, observation signal selecting means 802 is further added to the first exemplary embodiment. The observation signal selecting means 802 selects the number of observation signals 108 determined by the observation signal number determining means 107 at random from the signal information 103 enumerated by the circuit analysis means 102, thereby generating observation signal information 801.

An overall operation of the fifth exemplary embodiment of the present invention will be described. The overall operation of the fifth exemplary embodiment of the present invention is obtained by adding step S900 to the process procedure of the first exemplary embodiment (refer to FIG. 2), as shown in FIG. 9.

In step 900, the observation signal selecting means 802 selects the number of observation signals 108 determined by the observation signal number determining means 107 from the signal information 103 enumerated by the circuit analysis means 102 at random, thereby generating the observation signal information 801.

An operation and an effect of the present exemplary embodiment are the same as those of the first exemplary embodiment. In the present exemplary embodiment, processes and functions of the circuit analysis means 102, observation signal number determining means 107, and observation signal selecting means 802 may be implemented by a program that runs on a computer.

Sixth Exemplary Embodiment

Next, a sixth exemplary embodiment of the present invention will be described. Components and an overall operation of the sixth exemplary embodiment of the present invention are the same as those of the fifth exemplary embodiment. This exemplary embodiment is different from the fifth exemplary embodiment in an operation of the circuit analysis means 102.

In the present exemplary embodiment, the circuit analysis means 102 does not deliver signals, which are known in advance not to change, to the signal information 103 which is an output of the circuit analysis means 102.

The signals which are known in advance not to change include signals, each having a fixed value connected to a power supply or the ground, a spare output signal, and so forth. These signals may be specified by a user, or may be automatically determined by the circuit analysis means 102. Further, depending on a test vector to be executed, there may be a case in which a circuit block which never operates is present. Thus, analysis about these signals and circuit blocks is made, thereby preventing these signals and circuit blocks from being output to the signal information 103.

Next, an operation and an effect of the present exemplary embodiment will be described. Compared with the fifth exemplary embodiment, this embodiment makes it possible to reduce a factor for unintentionally reducing a toggle rate in advance.

Seventh Exemplary Embodiment

Next, a seventh exemplary embodiment of the present invention will be described. In the sixth exemplary embodiment, the circuit analysis means 102 does not output to the signal information 103 the signal that is known in advance not to change. In the present exemplary embodiment, instead of not outputting to the signal information 103 the signal that is known in advance not to change, the observation signal selecting means 802 does not select the signal that is known in advance not to change.

An overall operation of the seventh exemplary embodiment of the present invention is the same as that of the sixth exemplary embodiment. Likewise, an operation and an effect of the present exemplary embodiment are the same as those of the sixth exemplary embodiment.

Eighth Exemplary Embodiment

Next, an eighth exemplary embodiment of the present invention will be described. An overall operation of the eighth exemplary embodiment of the present invention is the same as that of the fifth exemplary embodiment. The eighth exemplary embodiment of the present invention is different from the fifth exemplary embodiment in that the circuit analysis means 102 does not output a signal that is known in advance to change to the signal information 103 which is the output of the circuit analysis means 102.

The signals which are known in advance to change include a clock signal, a reset signal, or signals at input and output terminals of the circuit. These signals may be specified by a user, or the circuit analysis means 102 may automatically determine these signals.

Next, an operation and an effect of the present exemplary embodiment will be described. Compared with the fifth exemplary embodiment, the present exemplary embodiment makes it possible to reduce a factor for unintentionally increasing a toggle rate in advance.

Ninth Exemplary Embodiment

Next, a ninth exemplary embodiment of the present invention will be described. Being different from the eighth embodiment, the circuit analysis means 102 in the present exemplary embodiment does not output to the signal information 103 the signal that is known in advance to change, and the observation signal selecting means 802 in the present exemplary embodiment does not select the signal that is known in advance to change.

An overall operation of the ninth exemplary embodiment of the present invention is the same as that of the eighth embodiment. Likewise, an operation and an effect of the present exemplary embodiment are the same as those of the eighth exemplary embodiment.

Tenth Exemplary Embodiment

Next, a tenth exemplary embodiment of the present invention will be described. An overall operation of the tenth exemplary embodiment of the present invention is the same as that of the fifth embodiment. This exemplary embodiment is different from the fifth exemplary embodiment in control operations of the circuit analysis means 102 and the observation signal selecting means 802.

The circuit analysis means 102 in the present exemplary embodiment is different from that in the fifth exemplary embodiment. The circuit analysis means 102 in the present exemplary embodiment further analyzes a dependent relationship among signals, and outputs the dependent relationship.

The observation signal selecting means 802 in the present exemplary embodiment further makes signal selection so that so that there is no dependence among the selected signals.

The dependent relationship refers to a case where signals A and B are present in a circuit targeted for obtaining a toggle rate, and the signals A and B are connected by an inverter, for example. In this case, when the signal A changes, the signal B necessarily changes. Thus, when the toggle rate is low, the dependent relationship causes the toggle rate to become lower. When the toggle rate is high, the dependent relationship causes the toggle rate to become higher.

As another example of the dependent relationship, there is also an example where, when the value of the signal A changes, a signal whose value may change with the change is regarded as having the dependent relationship with the signal A, and signals other than that signal are regarded as having no dependent relationship with the signal A.

As a still another example of the dependent relationship, there is also an example where, when signals in the same circuit hierarchy are regarded as having the dependent relationship and signals in circuit hierarchies other than that circuit hierarchy are regarded as having no dependent relationship.

Next, an operation and an effect of the present exemplary embodiment will be described. Though the operation of selecting the signals so that there is no dependence among the signals in the present exemplary embodiment is not statistically allowed, but this operation functions to reduce the toggle rate (reduce omission of functional verification). Accordingly, the probability can be reduced that the toggle rate value according to the present invention is lower than an actual toggle rate.

Eleventh Exemplary Embodiment

Figure 10:
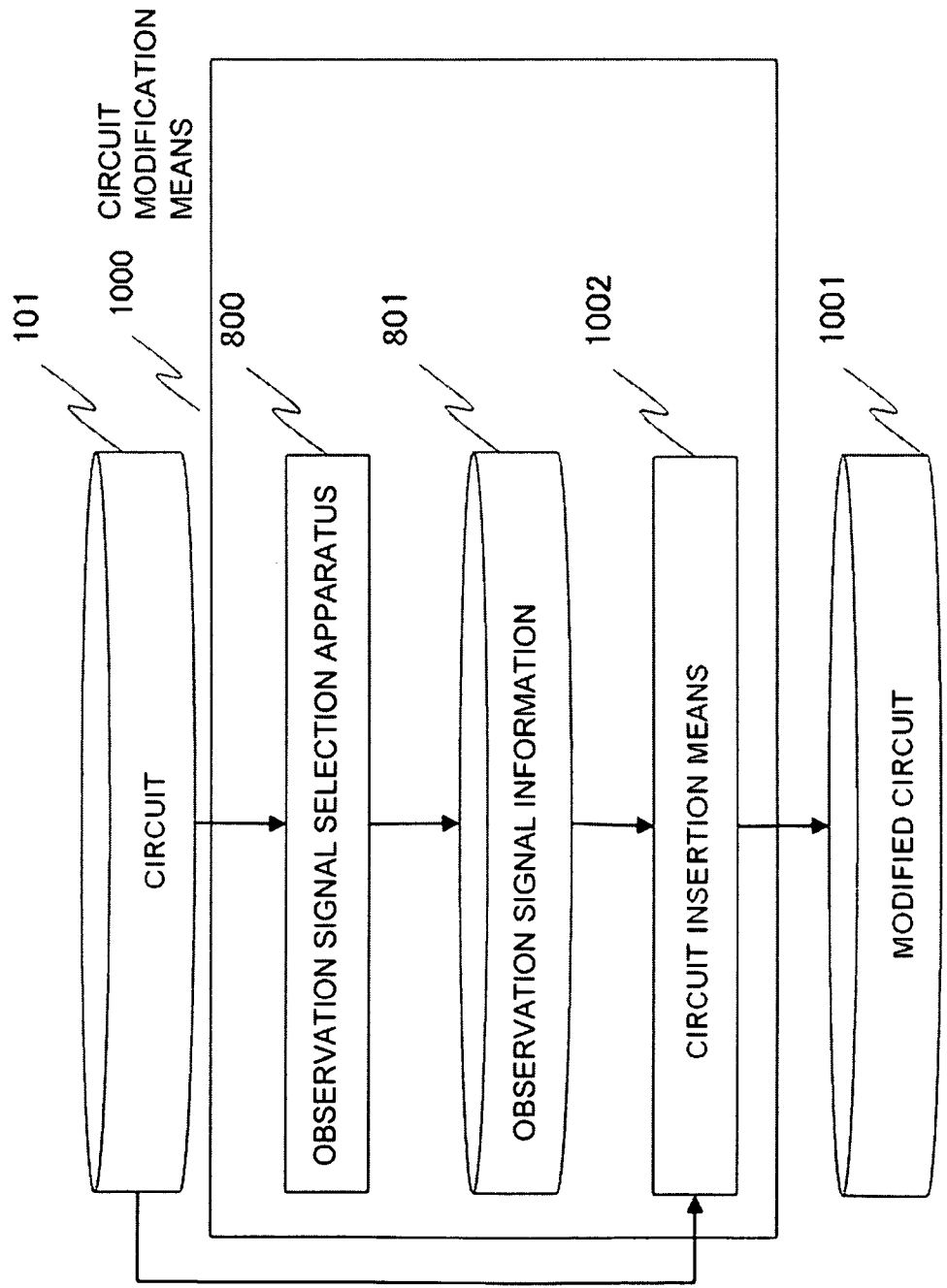
FIG. 10 is a diagram showing a configuration of an eleventh exemplary embodiment of the present invention.
Figure 11:
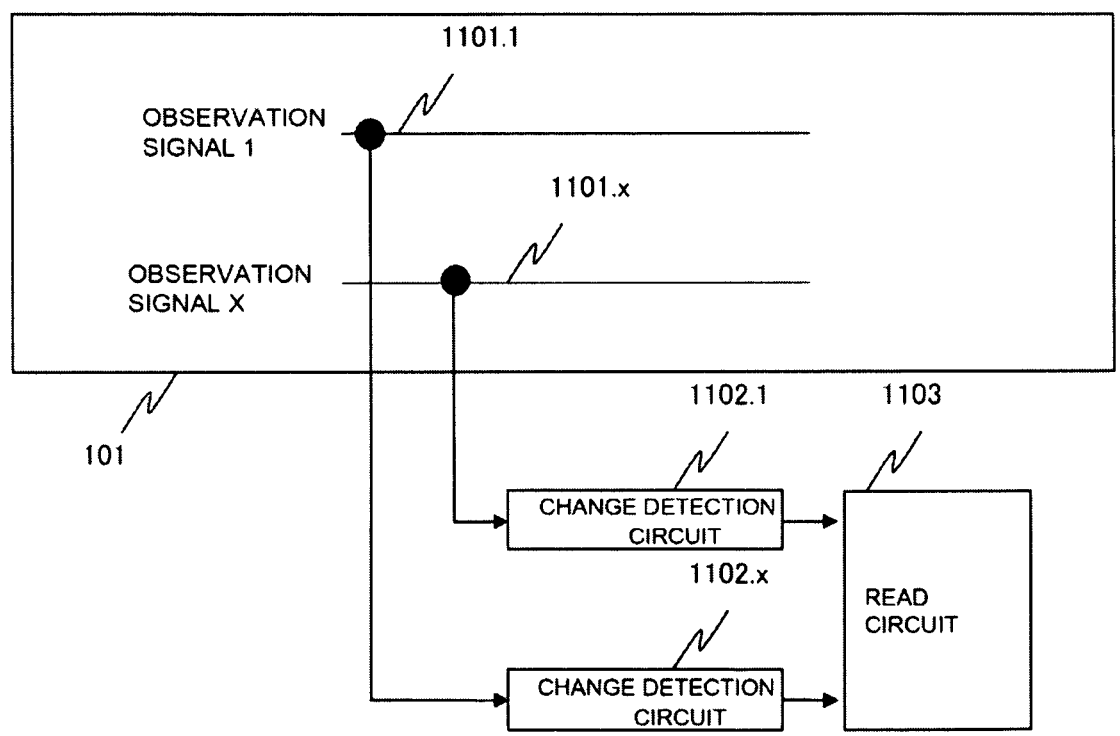
FIG. 11 is a schematic circuit diagram of a modified circuit 1001 generated by circuit insertion means in the eleventh exemplary embodiment of the present invention.

Next, an eleventh exemplary embodiment of the present invention will be described. Referring to FIGS. 10 and 11, the eleventh exemplary embodiment of the present invention includes the circuit 101 targeted for toggle rate measurement, the observation signal selection apparatus (also referred to as "a signal selection apparatus") 800 that receives the circuit 101 and outputs the observation signal information 801, and circuit insertion means 1002 for inserting change detection circuits 1102.1 to 1102.*x* and a read circuit 1103 into the circuit 101, and outputting a modified circuit 1001. The change detection circuits 1102.1 to 1102.*x* detect changes in respective observation signals 1101.1 to 1101.*x* in the observation signal information 801. The read circuit 1103 reads presence or absence of a change detected by each of the change detection circuits 1102.1 to 1102.*x*.

The eleventh exemplary embodiment of the present invention is obtained by adding the circuit insertion means 1002 to the fifth exemplary embodiment. Since the observation signal selection apparatus 800, circuit 101, and observation signal information 801 in FIG. 10 are the same as those in the fifth exemplary embodiment, descriptions of the details of these components will be omitted.

The circuit insertion means 1002 will be described. As shown in FIG. 11, the circuit insertion means 1002 generates a circuit of a configuration in which the change detection circuits 1102.1 to 1102.x and the read circuit 1103 for the x observation signals 1101.1 to 1101.x in the observation signal information 801 are inserted into the circuit 101.

Referring to FIG. 11, the change detection circuits 1102.1 to 1102.x and the read circuit 1103 are added outside the circuit 101 in a sense that a functional operation of the circuit 101 is not changed. Actually, the change detection circuits 1102.1 to 1102.x may be added in the vicinity of the observation signals. It means that the circuit insertion means 1002 should respectively connect the observation signals 1101.1 to 1101.x to the change detection circuit 1102.1 to 1102.x and connect the change detection circuits 1102.1 to 1102.x to the read circuit 1103 without changing the functional operation of the circuit 1101.

Figure 12:
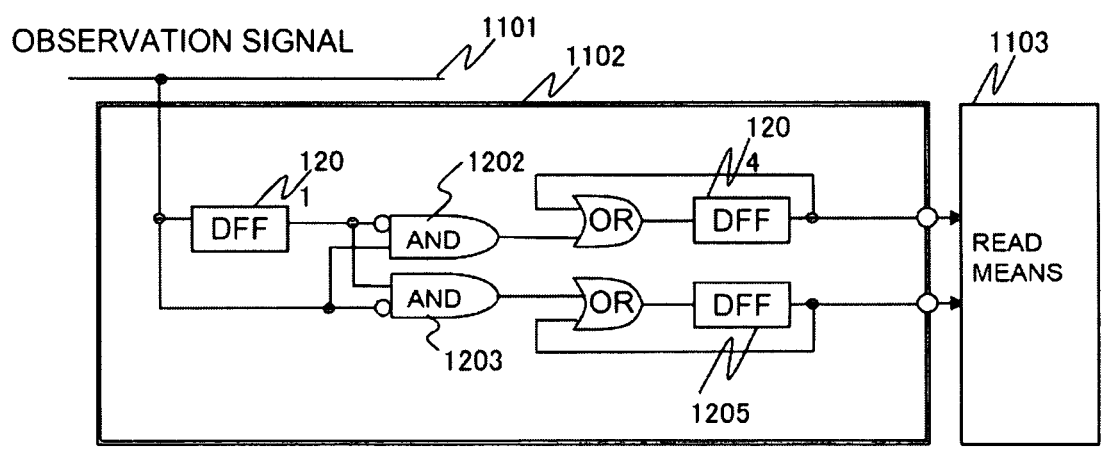
FIG. 12 is a diagram showing a configuration example of a change detection circuit in the eleventh exemplary embodiment of the present invention.

The x change detection circuits 1102.1 to 1102.x have the same function. FIG. 12 is a diagram showing an example of a more specific circuit configuration of each of the change detection circuits 1102.1 to 1102.x.

Referring to FIG. 12, each of the change detection circuits 1102.1 to 1102.x includes a DFF (D-type flip-flop) 1201 that outputs the value of an observation signal 1101 of one cycle earlier, an AND gate 1202 of which an output is 1 when the value of the observation signal 1101 is 1 and the value of the observation signal 1101 of one cycle earlier is 0, an AND gate 1203 of which an output is 1 when the value of the observation signal 1101 is 0 and the value of the observation signal 1101 of one cycle earlier is 1, a DFF 1204 that stores the value of 1 when the observation signal 101 has changed from 0 to 1 even once, and a DFF 1205 that stores the value of 1 when the observation signal 1101 has changed from 1 to 0 even once. In this case, in order to allow detection of a change in the observation signal 1101 except a jitter where the signal fluctuates during logic propagation, the fastest one of all flip-flop clock signals that latch the observation signal 1101 and a data signal that logically depends on the observation signal 1101 is used as a clock signal for the DFFs 1201, 1204, and 1205. In the configuration example in FIG. 12, the D-type flip-flops are used as means for storing the values. Other arbitrary configuration may be used if the configuration is means capable of storing the values.

Further, a reset signal and a clock enable signal may be provided for the DFFs 1204 and 1205 so that a toggle rate may be measured during a necessary test period alone.

The read means (read circuit) 1103 is means for reading values of the DFFs 1204 and 1205 inside each of the x change detection circuits 1102.1 to 1102.x. The read circuit in the present invention may have an arbitrary circuit configuration if only all the values of the DFFs 1204 and 1205 can be read. For example, the read circuit 1103 may be connected in series with the DFFs 1204 and 1205 so as to reduce the circuit scale or may be connected in parallel with the DFFs 1204 and 1205 so that the plurality of values may be read in parallel in order to reduce a read time.

Figure 13:
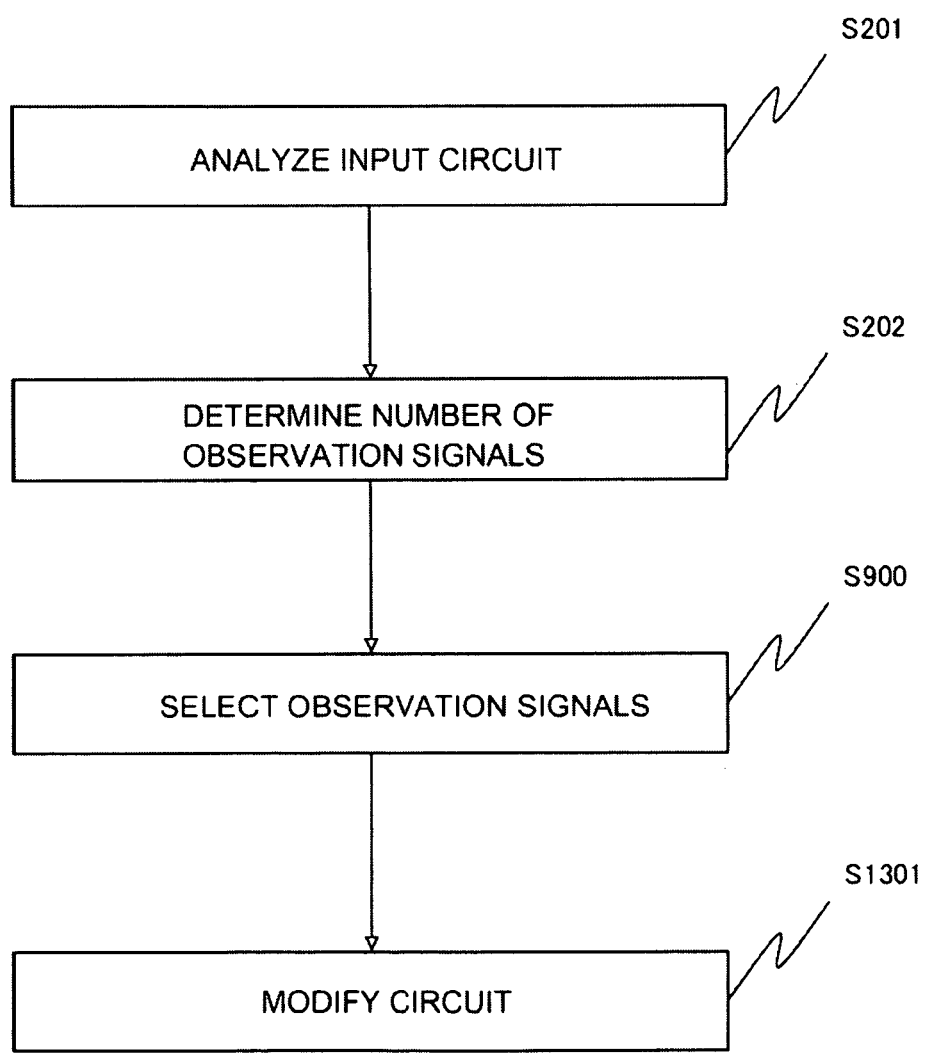
FIG. 13 is a flowchart for explaining an operation of the eleventh exemplary embodiment of the present invention.

Next, an overall operation of the present exemplary embodiment will be described with reference to a flowchart in FIG. 13. The operation of the present exemplary embodiment is obtained by adding step S1301 to the process procedure of the fifth exemplary embodiment (refer to FIG. 9).

In step S1301, the change detection circuits 1102.1 to 1102.x and the read means 1103 are inserted into the circuit 101 by the circuit insertion means 1002, thereby modifying the circuit 101.

Next, an operation and an effect of the present exemplary embodiment will be described. The operation and effect of the present exemplary embodiment is that the change detection circuit is added to each of the observation signals that may be several ten thousand depending on an estimation error range or confidence coefficient, and the change detection circuit is connected to the read means, thereby allowing reduction of the number of steps (complication). Further, the modification is automatically performed. A modification error that may occur when the modification is manually performed can be thereby prevented.

Further, the circuit targeted for measurement can be implemented on a digital LSI or an emulator without fail. Further, the range of the estimation error of a measured operation parameter can be minimized, or confidence coefficient can be maximized.

Further, by adding the reset signal and the clock enable signal to the DFFs 1204 and 1205, the toggle rate can be measured during the necessary test period alone.

Further, by providing write means for the DFFs 1204 and 1205, there is also an advantage that results when a plurality of test benches are implemented are easy to be merged. The observation signal selection apparatus 800 and the circuit insertion means 1002 may be implemented by a program of a computer that constitutes the circuit modifying means 1000.

Twelfth Exemplary Embodiment

Next, a twelfth exemplary embodiment of the present invention will be described. In the twelfth exemplary embodiment, it is arranged that the change detection circuit 1102 in the eleventh exemplary embodiment can not only detect presence or absence of a change but also store the number of changes. Read means 1103 is also configured to allow reading of the number of changes from the change detection circuit 1102.

An overall operation of the present exemplary embodiment is the same as that of the eleventh exemplary embodiment. x change detection circuits 1102.1 to 1102.x in the present exemplary embodiment have the same function.

Figure 14:
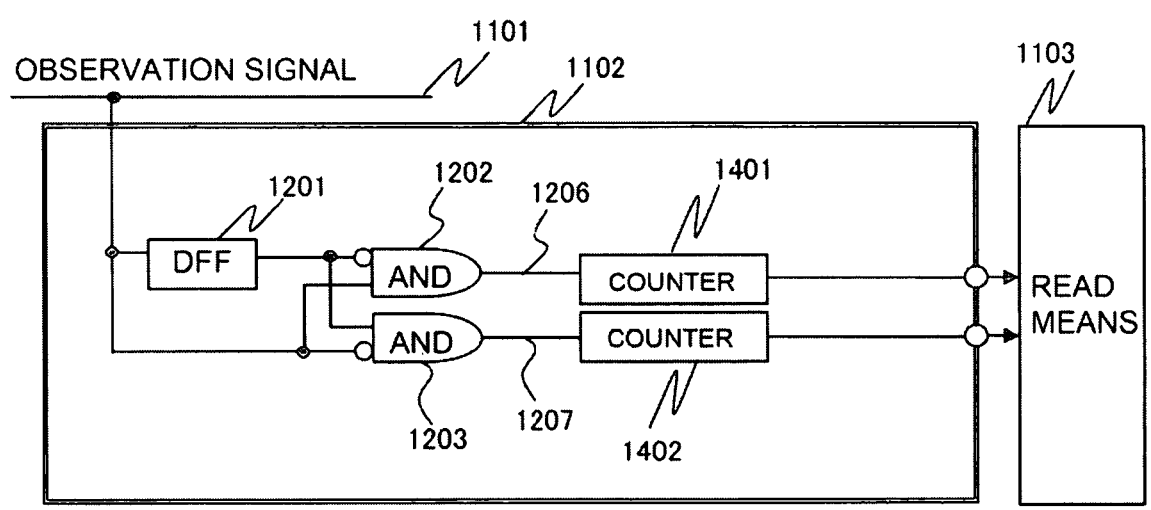
FIG. 14 is a diagram showing a configuration example of a change detection circuit in a twelfth exemplary embodiment of the present invention.

FIG. 14 is a diagram showing a more specific configuration example of each of the change detection circuits 1102.1 to 1102.x.

Referring to FIG. 14, in each of the change detection circuits 1102.1 to 1102.x, the DFFs 1204 and 1205 (refer to FIG. 12) in the eleventh exemplary embodiment are replaced with counters 1401 and 1402 that count the numbers of changes of signal lines 1206 and 1207 to 1. In order to allow detection of a change in an observation signal 1101 except a jitter where the observation signal 1101 fluctuates during logic propagation, the fastest one of all flip-flop clock signals that latch the observation signal 1101 and a data signal that logically depends on the observation signal 1101 is used as a clock signal for the counters 1401 and 1402.

Further, a reset signal and a clock enable signal may be provided for the counters 1401 and 1402 so that a toggle rate and power consumption can be measured during a necessary test period alone.

The read means 1103 reads values of the counters 1401 and 1402 inside the x change detection circuits 1102.1 to 1102.x. The read means 1103 may have an arbitrary circuit configuration only if the read means 1103 can read all the values of the counters 1401 and 1402. For example, the read means 1103 may be connected in series with the counters 1401 and 1402 so as to reduce the circuit scale or may be connected in parallel with the counters 1401 and 1402 so that the plurality of values may be read in parallel in order to reduce a read time.

Next, an operation and an effect of the present exemplary embodiment will be described. The operation and effect of the present exemplary embodiment is that there is an advantage that the power consumption can be estimated like the toggle rate based on the number of changes.

Thirteenth Exemplary Embodiment

Figure 15:
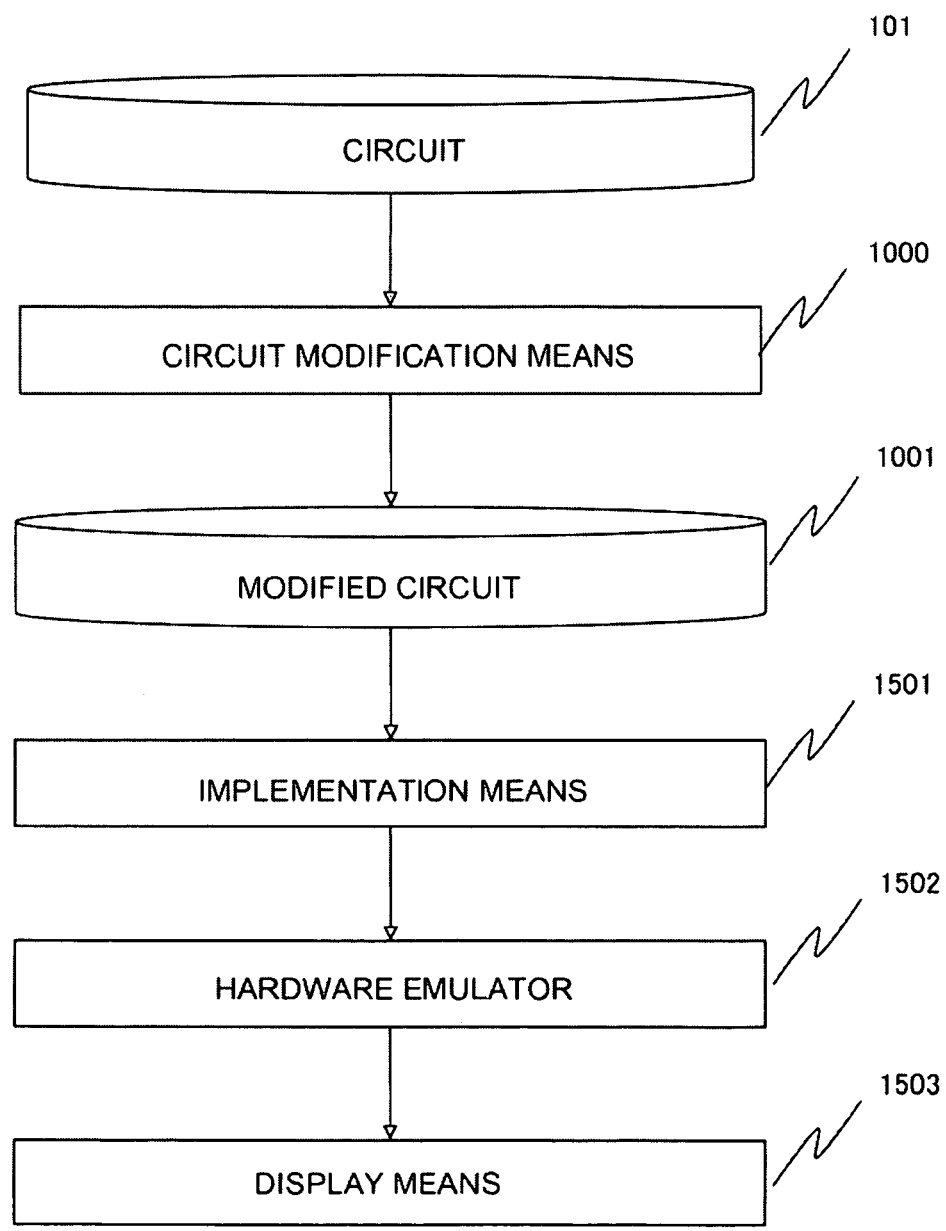
FIG. 15 is a diagram showing a configuration of a thirteenth exemplary embodiment of the present invention.

Next, a thirteenth exemplary embodiment of the present invention will be described with reference to FIG. 15. Referring to FIG. 15, in a device according to the thirteenth exemplary embodiment of the present invention, a toggle rate or power consumption is measured by a hardware emulator. The thirteenth exemplary embodiment of the present invention includes a circuit 101, circuit modification means 1000, a modified circuit 1001, implementation means 1501 for implementing the modified circuit 1001 into a hardware emulator 1502, the hardware emulator 1502 that emulates an operation of the modified circuit, and display means 1503 for displaying the toggle rate and the power consumption after the operation of the emulator.

Figure 16:
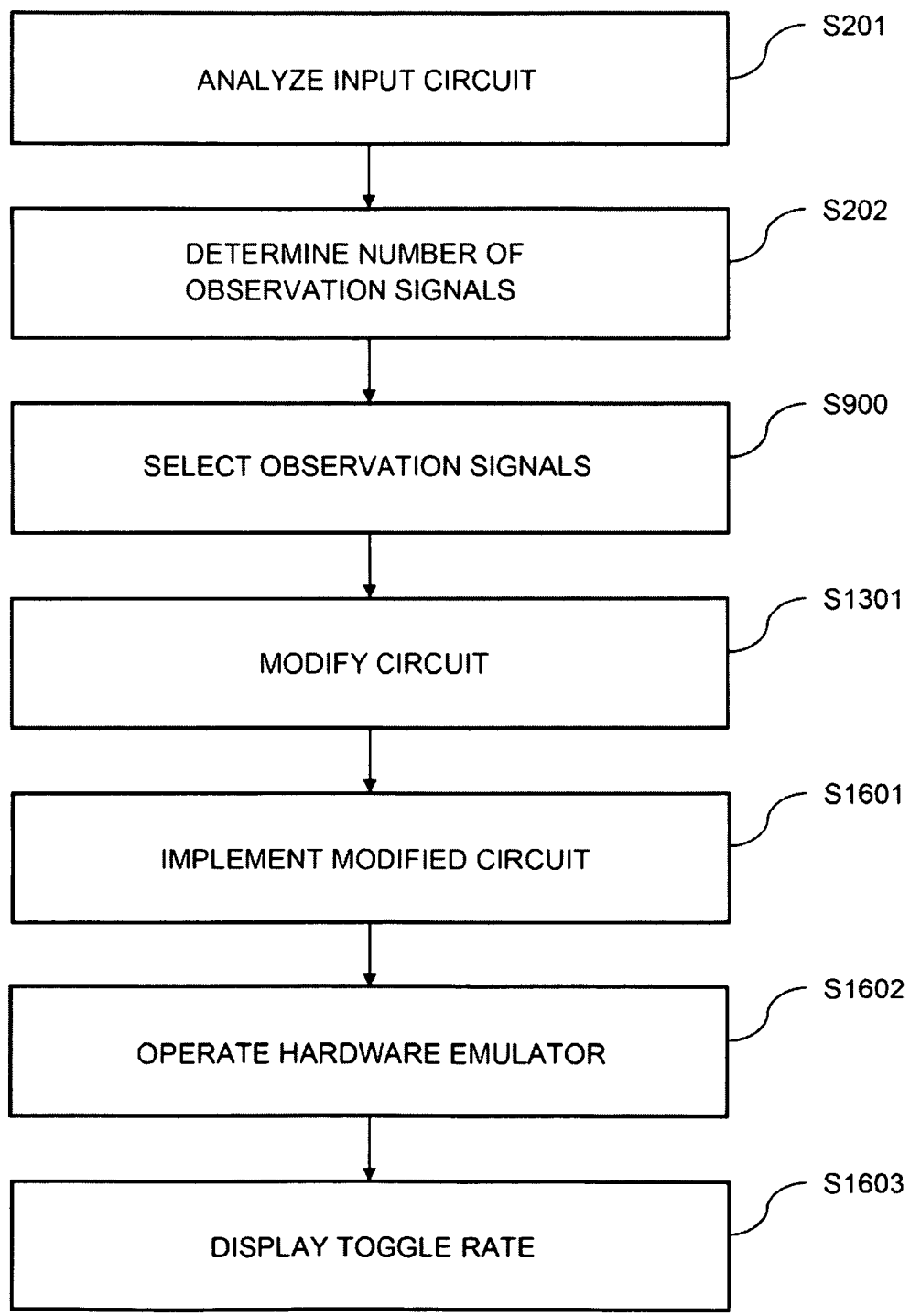
FIG. 16 is a flowchart for explaining an operation of the thirteenth exemplary embodiment of the present invention.

Next, an overall operation of the present exemplary embodiment will be described with reference to a flowchart in FIG. 16. Steps to a step for the modified circuit 1001 (step S1301 in FIG. 16) are the same as those for generation of the modified circuit 1001 described in the eleventh exemplary embodiment (refer to FIG. 13).

In step S1601, the modified circuit 1001 is implemented on the hardware emulator 1502 by the implementation means 1501. In case the hardware emulator 1502 includes an FPGA, the implementation means 1501 includes a synthesis tool that generates a netlist from the modified circuit 1001 described in Verilog-HDL or VHDL and a tool for implementing the generated netlist into the FPGA.

Next, in step S1602, the hardware emulator 1502 is operated. While the hardware emulator 1502 is operated, change detection circuits 1102.1 to 1102.x of the circuit implemented on the hardware emulator detect whether the value of each observation signal 1101 has changed (refer to FIG. 11). When the operation of the hardware emulator 1502 is finished, the operation moves to step S1603.

In step S1603, the changes detected by the x change detection circuits 1102.1 to 1102.x are read through the read means 1103, and then the toggle rate is thereby calculated and displayed. In case the number of the signals that have changed from 0 to 1 is 40 even once and the number of the signals that have changed from 1 to 0 even once is 60 among 100 signals during the operation of the hardware emulator 1502, for example, the toggle rate becomes (40+60)/(2*100)=0.5, and the toggle rate of 50% is displayed on the display means 1503.

An operation and an effect of the present exemplary embodiment are the same as those of the eleventh exemplary embodiment except that the toggle rate and the power consumption are measured by the hardware emulator.

Fourteenth Exemplary Embodiment

Figure 17:
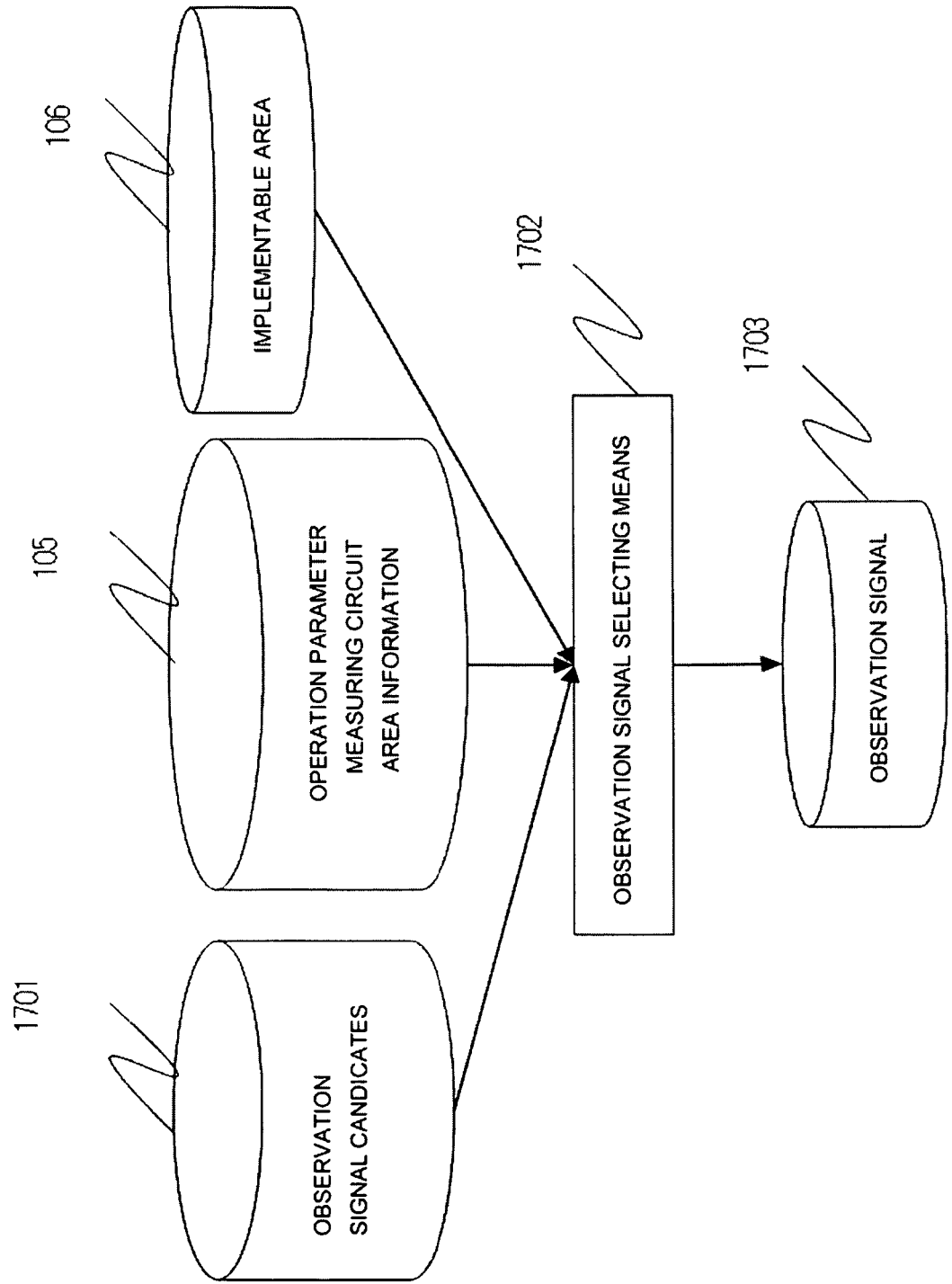
FIG. 17 is a diagram showing a configuration of a fourteenth exemplary embodiment of the present invention.

Next, a fourteenth exemplary embodiment of the present invention will be described with reference to FIG. 17. Referring to FIG. 17, in the fourteenth exemplary embodiment of the present invention, an observation signal is selected from among observation signal candidates with priorities given in advance, within a range that can be implemented on a circuit implementation device.

Details of these means will be described. Monitoring signal candidates 1701 show from which signal observation is to be sequentially performed when obtaining an operation parameter. The observation signal candidates 1701 store information indicating that a signal A in a circuit is most preferentially selected, next a signal B is selected, and next a signal C is selected, for example.

The observation signal selecting means 1702 selects observation signals from among the observation signal candidates 1701, starting from the observation signal with the highest priority. Then, the observation signal selecting means 1702 checks whether the circuit targeted for operation parameter measurement and an operation parameter measuring circuit can be implemented on the circuit implementation device, based on the area information 105 on the operation parameter measuring circuit necessary for measuring that observation signal and an area 106 in which the circuit implementation device can be implemented. If the implementation is possible, the observation signal with a next highest priority is added, and then the check is made again. At a point in time when the implementation becomes impossible, a list of the signals excepting the signal selected currently is output as observation signals 1703.

Figure 18:
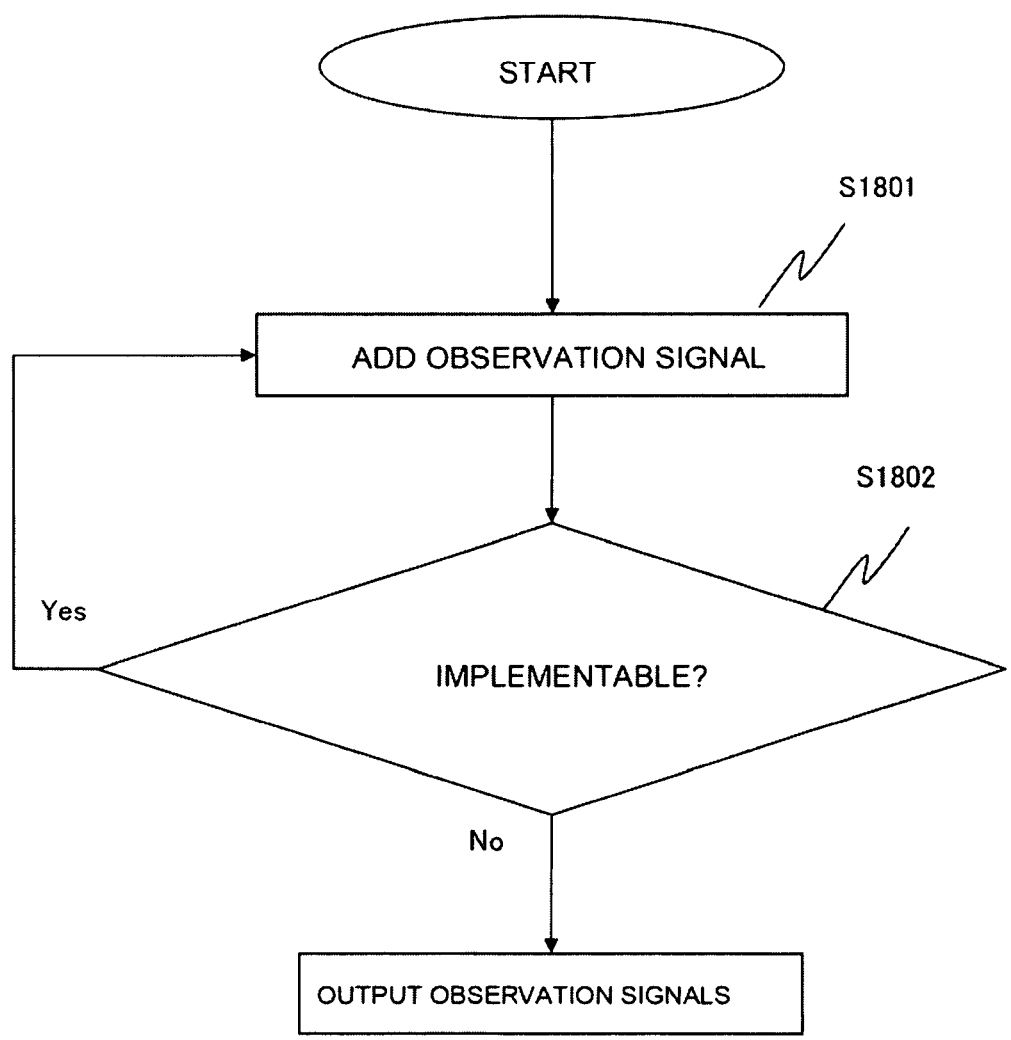
FIG. 18 is a flowchart for explaining an operation of observation signal selecting means in the fourteenth exemplary embodiment of the present invention.

Next, an operation of the observation signal selecting means 1702 will be described with reference to a flowchart in FIG. 18.

In step S1801, the observation signal selecting means 1702 selects one of the signals having the highest priority that has not been selected yet by the observation signal selecting means 1702 from among the observation signal candidates 1701.

In step S1802, it is calculated whether the observation signals selected before and the signal selected currently can be implemented on the circuit implementation means. When the implementation is possible, the operation returns to step S1801 again. When the implementation is not possible, a list of the observation signals selected before is output as the observation signals 1703.

Next, an operation and an effect of the present exemplary embodiment will be described. In the present exemplary embodiment, even when the circuit implementation device is formed of a plurality of circuit implementation devices, the circuit targeted for measurement can be all implemented on digital LSIs or emulators. Further, the range of the estimation error of a measured operation parameter can be minimized or confidence coefficient can be maximized.

Further, the priorities of the observation signals can be arbitrarily set by a user. Thus, there is an effect that the user can preferentially select a portion the user desires to observe with particular emphasis placed thereon. The observation signal selecting means 1702 in the present exemplary embodiment may be implemented by a program that runs on a computer.

Specific Example

Next, using FIG. 19 described in Verilog-HDL as a specific example, the first exemplary embodiment will be described.

Figure 2:
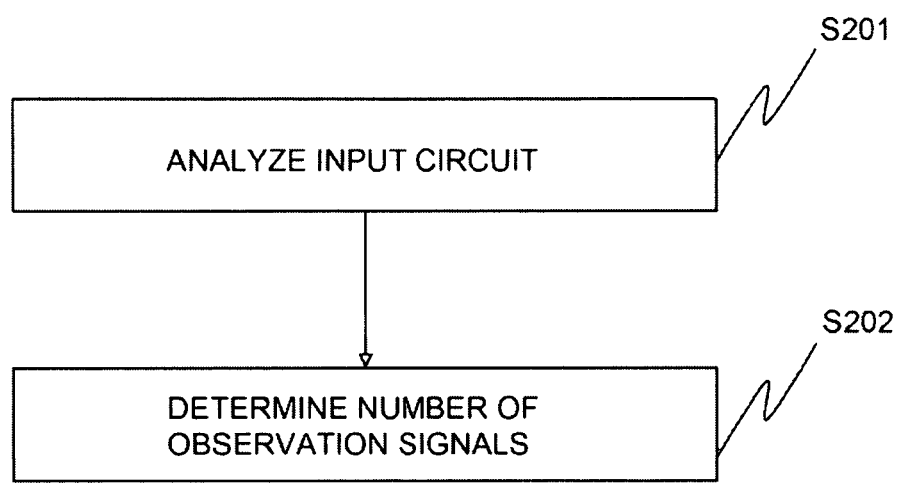
FIG. 2 is a flowchart for explaining an operation of the first exemplary embodiment of the present invention.

In step S201 in FIG. 2, an input circuit (in FIG. 19) is analyzed by circuit analysis means 102. In this case, it is analyzed that there are signals clk, count[9999:0], hit, and enable. Further, the area occupied by this circuit is calculated and stored in area information 104. It is assumed that the area is set to 6000 in this case, for example. The value of the area greatly differs, depending on a circuit implementation device. When the circuit implementation device is a digital LSI, the area is determined from the number of logics and storage elements when the circuit 101 is mapped to a cell library provided in a process of implementing the circuit 101. Further, when the circuit implementation device is an FPGA, the area is determined from the number of use of logics and storage elements when the circuit 101 is mapped to the FPGA.

In next step S202, a maximum number of observation signals 108 that can be implemented by the circuit implementation device is determined from the area information 104, operation parameter measuring circuit area information 105, an (implementable) area 106 that can be implemented on the circuit implementation device. Assume that the area that can be implemented on the circuit implementation device is 10000, the area of the circuit 101 is 6000, the area of an operation parameter measuring circuit is 10 per signal, for example. The observation signal number determining means 107 calculates (10000−6000)÷10, thereby obtaining the number of observation signals of 400.

The present invention can be applied to a use such as circuit function verification. The present invention can be used for power estimation or the like, as well.

The above description was given about the present invention in connection with the embodiment described above. The present invention is not limited to the configuration of the embodiment described above alone, and of course includes various variations and modifications that could be made by those skilled in the art within the scope of the present invention.

What is claimed is:

1. An observation signal information determination apparatus that determines a number of observation signals for obtaining an operation parameter of a circuit, the apparatus comprising:
   a first storage unit storing information on an implementable area that may be implemented on a circuit implementation device;
   a second storage unit storing information on an area in case of the circuit being implemented by a circuit implementation device;
   a third storage unit storing information on a circuit area necessary for each of the observation signals; and
   an observation signal information determining unit obtains a surplus circuit scale based on calculation using the information on an implementable area and the information on an area in case of the circuit being implemented by the circuit implementation device,
   wherein the observation signal information determining unit determines teh number of the observation signals, based on calculation using the surplus circuit scale and the information on the circuit area necessary for each of the observation signals.

2. A signal selection apparatus comprising:
   an observation signal selecting unit that selects the observation signals of the number determined by the observation signal information determination apparatus as set forth in claim 1.

3. An observation signal information determination apparatus that determines a number of observation signals for obtaining an operation parameter of a circuit, the apparatus comprising:
   a first storage unit storing information on an implementable area implemented on a circuit implementation device,
   a second storage unit storing information on an area in case of the circuit being implemented by a circuit implementation device;
   a third storage unit storing information on a circuit area necessary for each of the observation signals; and
   an observation signal information determining unit that determines the number of the observation signals, based on
   the information on an implementable area that implemented on a circuit implementation device,
   the information on an area in case of the circuit being implemented by the circuit implementation device, and
   the information on a circuit area necessary for each of the observation signals, wherein the observation signal information determining unit determines a value obtained by subtracting the information on the area in case of the circuit being implemented by the circuit implementation device from the information on the implementable area implemented on the circuit implementation device as information on a surplus circuit scale, and determines the number of the observation signals based on a value obtained by dividing the information on the surplus circuit scale by the information on the area of an operation parameter measuring circuit per observation signal, the operation parameter measuring circuit measuring the operation parameter.

4. The observation signal information determination apparatus according to claim 3, comprising:
   a calculation unit that statistically determines an estimation error range and/or confidence coefficient from the number of the observation signals and a number of signals of the circuit.

5. A circuit implementation device selection supporting apparatus comprising:
   the observation signal information determination apparatus as set forth in claim 4,
   the circuit implementation device selection supporting apparatus presenting information on an estimation error range and/or a confidence coefficient of the operation parameter with respect to each of the plurality of circuit implementation devices to a user, using the calculation unit to support circuit implementation device selection.

6. The observation signal information determination apparatus according to claim 4, wherein the operation parameter includes a toggle rate or power consumption, and
   the calculation unit statistically determines the estimation error range and the confidence coefficient, assuming that a probability distribution of the operation parameter is a normal distribution.

7. The observation signal information determination apparatus according to claim 3, wherein the circuit implementation device is implemented by a plurality of circuit implementation devices,
   the observation signal information determining unit obtains each surplus circuit scale when each of the plurality of circuit implementation devices implements a predetermined portion of the circuit, and
   the observation signal information determining unit determines a maximum number of the observation signals implemented by each of the circuit implementation devices from the respective surplus circuit scale and the circuit size necessary for each of the observation signals.

8. The observation signal information determination apparatus according to claim 7, further comprising:
   a calculation unit that statistically determines an estimation error range and/or confidence coefficient from a sum of numbers of the observation signals determined by the observation signal information determining unit and a number of signals of the circuit.

9. A method of determining a number of observation signals for obtaining an operation parameter of a circuit, the method executed by a processor and comprising:

receiving information on an implementable area implemented on a circuit implementation device, information on an area in case of the circuit being implemented by a circuit implementation device, and information on a circuit area necessary for each of the observation signals;

obtaining a surplus circuit scale based on calculation using the information on an implementable area, and the information on an area in case of the circuit being implemented by the circuit implementation device;

determining the number of the observation signals, based on calculation using the surplus circuit scale and the information on the circuit area necessary for each of the observation signals using the processor.

10. A non-transitory computer readable medium storing a program that causes a computer which performs a processing of determining a number of observation signals for obtaining an operation parameter of a circuit to execute the processing comprising:

receiving information on an implementable area implemented on a circuit implementation device, information on an area in case of the circuit being implemented by a circuit implementation device, and information on a circuit area necessary for each of the observation signals;

obtaining a surplus circuit scale based on calculation using the information on an implementable area, and the information on an area in case of the circuit being implemented by the circuit implementation device;

determining the number of the observation signals, based on calculation using the surplus circuit scale and the information on the circuit area necessary for each of the observation signals.

\* \* \* \* \*